United States Patent [19]

Fennemann et al.

[11] Patent Number: 4,950,139
[45] Date of Patent: Aug. 21, 1990

[54] PROCESS OF CATALYTICALLY REDUCING NO

[75] Inventors: Wolfgang Fennemann, Karben; Werner Weisweiler, Remchingen-Singen; Burkhard Retzlaff; Bernd Hochstein, both of Karlsruhe, all of Fed. Rep. of Germany

[73] Assignee: Metallgesellschaft Aktiengesellschaft, Frankfurt am Main, Fed. Rep. of Germany

[21] Appl. No.: 297,830

[22] Filed: Jan. 17, 1989

[30] Foreign Application Priority Data

Jan. 22, 1988 [DE] Fed. Rep. of Germany ....... 3801785

[51] Int. Cl.$^5$ ............................ B01J 8/00; C01B 21/00
[52] U.S. Cl. ..................................................... 423/239
[58] Field of Search ................... 423/239, 239 A, 235, 423/235 D

[56] References Cited

U.S. PATENT DOCUMENTS 4,107,272  8/1978  Mori et al. .......................... 423/239
4,378,338  3/1983  Imanari et al. ...................... 423/239

FOREIGN PATENT DOCUMENTS

| 2454515 | 5/1975 | Fed. Rep. of Germany . |
| 2748471 | 11/1976 | Fed. Rep. of Germany . |
| 3641773 | 6/1988 | Fed. Rep. of Germany . |
| 3642980 | 6/1988 | Fed. Rep. of Germany . |
| 3701527 | 8/1988 | Fed. Rep. of Germany . |
| 3633493 | 3/1989 | Fed. Rep. of Germany . |
| 2285922 | 9/1974 | France . |
| 1448325 | 9/1976 | United Kingdom . |

Primary Examiner—Gregory A. Heller
Attorney, Agent, or Firm—Felfe & Lynch

[57] ABSTRACT

A process is disclosed wherein NO contained in a gas is reduced by means of $NH_3$ as a reducing agent. A mixture of the NO-containing gas and $NH_3$ is reacted at 290° to 450° C. in the presence of a catalyst, which comprises a support of $SiO_2$ and contains 5 to 15% by weight manganese sulfate and iron sulfate. The mole ratio of manganese sulfate and iron sulfate, which is calculated as $FeSO_4$, is between 1:10 and 10:1. The support has a pore volume of 0.6 to 1.6 ml/g and an average pore diameter of 10 to 100 nm.

4 Claims, No Drawings

PROCESS OF CATALYTICALLY REDUCING NO

BACKGROUND OF THE INVENTION

The present invention is in a process of catalytically reducing NO which is contained in a gas by means of $NH_3$ as a reducing agent, wherein the NO-containing gas is mixed with $NH_3$ and the mixture is reacted under normal pressure on a catalyst.

It is an object of the invention to use a catalyst which has a high NO-reducing capacity and which contains only elements which will not pollute the environment so that the catalyst when it is spent can be dumped on a waste dump without the need for special precautions.

THE INVENTION

The object underlying the invention is accomplished in that the mixture of the NO-containing gas and the $NH_3$ is reacted at a temperature of from 290° to 450° C. on a catalyst which has a support consisting of $SiO_2$ and contains 5 to 15% by weight manganese sulfate and iron sulfate applied to the support, iron sulfate being $FeSO_4$ and/or $Fe_2(SO_4)_3$. The mole ratio of manganese sulfate to iron sulfate, the latter calculated as $FeSO_4$, is from 1:10 to 10:1. The iron sulfate used within the scope of the invention, may consist of $FeSO_2$ or $Fe_2(SO_4)_3$.

The reaction is generally carried out with a molar ratio of $NO:NH_3$ in the range of 1:0.7 to 1:1.3. The catalyst can be used as a fixed or fluidized bed for carrying out the reaction.

It has been found that when used in the above-mentioned temperature range that catalyst has a very high NO-reducing capacity. Owing to its composition, the catalyst will not pollute the environment when it has been dumped on a waste dump. The compatibility of the catalyst with the environment is due to the fact that it has only relatively low contents of soluble compounds of manganese and iron. Whereas such compounds may be mobilized in the soil, they will be hydrolyzed there to form solid hydroxides and hydroxyoxide of iron and manganese, which are inherently present everywhere in nature and are non-polluting.

Also in accordance with the invention the catalyst contains 0.001 to 0.01 mole $Y_2(SO_4)_3$, $TiOSO_4$ or $Zr(SO_4)_2$ per mole of manganese sulfate or iron sulfate. Due to the presence of these latter compounds, the lattice of the support contains defects which act as active centers for reducing NO and which impart to the catalyst a long-term stability so that its activity will be constant for an extended period of use.

In accordance with a further feature of the invention, the support has a pore diameter of 10 to 100 nm. With such a support the catalyst will have a high capacity. It has also been found that it is suitable within the scope of the invention to use in the support an $SiO_2$ which has a purity of 97 to 99.9% because an increase of the purity of the $SiO_2$ support will result in an increase of the capacity of the catalyst and in a decrease of the fluctuation of the capacity of the catalyst.

The impurities which are contained in the $SiO_2$ preferably consist of oxides of aluminum, iron and titanium.

The subject matter of the invention will be explained more in detail hereinafter with reference to an Example.

EXAMPLE

Support particles which were 1.5 to 1.7 mm in diameter and consisted of 99.7% $SiO_2$ were impregnated with an aqueous salt solution, which contained 0.5 mole $MnSO_4$ per liter and 0.5 mole $FeSO_4$ per liter and which was adjusted to a pH value of 3 by the addition of $H_2SO_4$. The impregnated particles were dried and subsequently ignited at about 500° C. The catalyst was placed into a fluidized bed reactor and for a trial operation at temperatures between 290° and 450° C. The fluidized bed reactor was continuously supplied with a preheated gas mixture, which contained 0.75% by volume NO, 0.75% by volume $NH_3$, 5% by volume $O_2$, 0.7% by volume $SO_2$; balance $N_2$. The nitrogen oxide-reducing capacity in the tested temperature range amounted to at least 90% and reached a maximum of 93% at about 350° C. When the NO content of the gas was decreased to 0.075% by volume and the content of the added $NH_3$ was decreased to 0.075% by volume, the NO-reducing capacity in the tested temperature range decreased to 89 to 90%. As the catalyst had a high abrasion resistance it is particularly suitable for use in a circulating fluidized bed. The content of catalytically active substances in the catalyst was not changed during the long-time operation. In the spent catalyst the iron contained therein was present as divalent and as trivalent iron.

It will be understood that the specification and examples are illustrative but not limitative of the present invention and that other embodiments within the spirit and scope of the invention will suggest themselves to those skilled in the art.

We claim:

1. A process for catalytically reducing NO which is contained in a gas comprising:
   mixing the NO-containing with $NH_3$ to form a mixture; and
   reacting the mixture at a temperature of from 290° C. to 450° C. under normal pressure in the presence of a catalyst which has a support consisting of $SiO_2$ and contains 5 to 15% by weight manganese sulfate and iron sulfate applied to the support, the iron sulfate being at least one of $FeSO_4$ and $Fe_2(SO_4)_3$, the mole ratio of manganese sulfate to iron sulfate, the latter calculated as $FeSO_4$, being between 1:10 and 10:1.

2. The process of claim 1 wherein the catalyst contains 0.001 to 0.01 mole $Y_2(SO_4)_3$, $TiOSO_4$ or $Zr(SO_4)_2$ per mole of manganese sulfate or iron sulfate.

3. The process of claim 1 wherein the support has a pore volume of 0.6 to 1.6 ml/g and an average pore diameter of 10 to 100 nm.

4. The process of claim 1 wherein the $SiO_2$ of the support has a purity of 97 to 99.9%.

* * * * *